(12) United States Patent
Jin et al.

(10) Patent No.: US 12,068,769 B2
(45) Date of Patent: Aug. 20, 2024

(54) TRANSPARENT ANTENNA AND COMMUNICATION SYSTEM

(71) Applicants: Beijing BOE Sensor Technology Co., Ltd., Beijing (CN); BOE TECHNOLOGY GROUP CO., LTD., Beijing (CN)

(72) Inventors: Yunnan Jin, Beijing (CN); Zhifeng Zhang, Beijing (CN); Chunnan Feng, Beijing (CN); Yong Li, Beijing (CN); Haoyang Zhang, Beijing (CN); Feng Qu, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/772,255

(22) PCT Filed: May 28, 2021

(86) PCT No.: PCT/CN2021/096837
§ 371 (c)(1),
(2) Date: Apr. 27, 2022

(87) PCT Pub. No.: WO2022/246814
PCT Pub. Date: Dec. 1, 2022

(65) Prior Publication Data
US 2024/0146349 A1 May 2, 2024

(51) Int. Cl.
*H04B 1/38* (2015.01)
*H01Q 1/38* (2006.01)
(Continued)

(52) U.S. Cl.
CPC .............. *H04B 1/38* (2013.01); *H01Q 1/38* (2013.01); *H01Q 1/48* (2013.01); *H01Q 1/50* (2013.01)

(58) Field of Classification Search
CPC ... H04B 1/38; H01Q 1/38; H01Q 1/48; H01Q 1/50; H01Q 1/00
(Continued)

(56) References Cited

U.S. PATENT DOCUMENTS

2020/0321691 A1* 10/2020 Jia .......................... H01Q 1/523
2023/0216179 A1* 7/2023 Kum ..................... H01Q 21/24
343/893
2024/0121999 A1* 4/2024 Iimura ............... H10K 59/1275

FOREIGN PATENT DOCUMENTS

CN 107425254 A 12/2017
CN 110323543 A 10/2019
(Continued)

*Primary Examiner* — Eugene Yun
(74) *Attorney, Agent, or Firm* — HOUTTEMAN LAW LLC

(57) ABSTRACT

An transparent antenna includes a first substrate and a second substrate oppositely arranged; the first substrate includes: a first dielectric layer having a first surface and a second surface oppositely arranged; a reference electrode layer on the first surface; at least one first radiation part on the second surface and having a orthographic projection on the first surface at least partially overlapping an orthographic projection of the reference electrode layer on the first surface; at least one feeding structure on the second surface and feeding the first radiation part; the second substrate includes: a second dielectric layer having a third surface opposite to the second surface and a fourth surface oppositely arranged; at least one second radiation part on the fourth surface, an orthographic projection of each second radiation part on the first surface is within an orthographic projection of one first radiation part on the first surface.

20 Claims, 8 Drawing Sheets

(51) Int. Cl.
*H01Q 1/48* (2006.01)
*H01Q 1/50* (2006.01)

(58) Field of Classification Search
USPC .......................................................... 455/73
See application file for complete search history.

(56) References Cited

FOREIGN PATENT DOCUMENTS

| | | | |
|---|---|---|---|
| CN | 111342222 A | 6/2020 |
| CN | 213845498 U | 7/2021 |
| WO | WO 2013092821 A1 | 6/2013 |

\* cited by examiner

TRANSPARENT ANTENNA AND COMMUNICATION SYSTEM

TECHNICAL FIELD

The present disclosure belongs to the field of communication technology, and particularly relates to a transparent antenna and a communication system.

BACKGROUND

With a continuous development of mobile communication technology, additional functional attributes of a glass window are increasingly remarkable. A fusion application of an antenna and the glass window becomes one of the most representative applications. Since a traditional antenna cannot be transparent, when the traditional antenna is used together with a transparent glass window, firstly, aesthetic of a whole surface of the glass window is influenced; secondly, due to a characteristic of a strong attenuation of glass to electromagnetic waves, when the antenna is closely attached to the glass window, the antenna cannot effectively radiate electromagnetic energy, and finally a problem of low antenna gain is caused. Therefore, it will become a trend toward a 5G embellished antenna to design an antenna design scheme that may not only ensure high gain performance of the antenna, but also ensure transparency of the antenna.

SUMMARY

The present disclosure is directed to at least one of the problems in the related art, and provides a transparent antenna and a communication system.

In a first aspect, an embodiment of the present disclosure provides a transparent antenna, including a first substrate and a second substrate which are opposite to each other,
wherein the first substrate includes:
a first dielectric layer, which has a first surface and a second surface which are opposite to each other;
a reference electrode layer, which is on the first surface;
at least one first radiation part, which is on the second surface, wherein an orthographic projection of at least one first radiation part on the first surface at least partially overlaps an orthographic projection of the reference electrode layer on the first surface; and
at least one feeding structure, which is on the second surface and configured to feed a signal to the at least one first radiation part, and
the second substrate includes:
a second dielectric layer, which has a third surface and a fourth surface which are opposite to each other, wherein the third surface is opposite to the second surface; and
at least one second radiation part, which is on the fourth surface, wherein an orthographic projection of each of the at least one first radiation part on the first surface is within an orthographic projection of one of the at least one second radiation part on the first surface.

A distance between the second surface of the first dielectric layer and the third surface of the second dielectric layer is a first distance; a distance between the second surface of the first dielectric layer and the fourth surface of the second dielectric layer is a second distance; and a ratio of the second distance to the first distance is not less than 1.12.

The ratio of the second distance to the first distance is not less than 1.37.

Each of the at least one first radiation part and the at least one second radiation part has a centrosymmetric pattern, and an orthographic projection of a symmetry center of one of the at least one first radiation part on the first surface overlaps an orthographic projection of a symmetry center of one of the at least one second radiation part on the first surface.

The at least one feeding structure includes a first feeding structure and a second feeding structure, each of which includes a first feeding port and at least one second feeding port;
each of the at least one second feeding port of the first feeding structure is connected to one of the at least one first radiation part, and a node at which the second feeding port is connected to the first radiation part is a first node; each of the at least one second feeding port of the second feeding structure is connected to one of the at least one first radiation part, and a node at which the second feeding port is connected to the first radiation part is a second node; and
for each of the at least one first radiation part, there is a included angle between an extending direction of a connecting line, which is between the first node and the symmetry center of the first radiation part, and an extending direction of a connecting line, which is between the second node and the symmetry center of the first radiation part.

For each of the at least one first radiation part, an extending direction of a connecting line between the first node and the symmetry center of the first radiation part is perpendicular to an extending direction of a connecting line between the second node and the symmetry center of the first radiation part.

Each of the at least one first radiation part includes a polygon, and any internal angle of the polygon is greater than 90°.

The polygon includes a first side, a second side, a third side, a fourth side, a fifth side, a sixth side, a seventh side, and an eighth side, which are connected in sequence; an extending direction of the first side is the same as an extending direction of the fifth side, and is perpendicular to an extending direction of the third side; and one of the at least one second feeding port of the first feeding structure and one of the at least one second feeding port of the second feeding structure are connected to the second side and the fourth side, respectively.

The at least one first radiation part includes $2^n$ first radiation parts, which are arranged at intervals along a length direction of the transparent antenna; each of the first feeding structure and the second feeding structure includes n stages of first microstrip lines;
one first microstrip line at a $1^{st}$ stage is connected to two adjacent first radiation parts, and the first radiation parts connected to different first microstrip lines at the $1^{st}$ stage are different; and one first microstrip line at an $m^{th}$ stage is connected to two adjacent first microstrip lines at an $(m-1)^{th}$ stage, and the first microstrip lines at the $(m-1)^{th}$ stage, which are connected to different first microstrip lines at the $m^{th}$ stage, are different; where $n \geq 2$, $2 \leq m \leq n$, and both m and n are integers.

The transparent antenna further includes a first connection electrode and a second connection electrode, which are on the second surface, wherein the first connection electrode is electrically connected to the first feeding port of the first feeding structure; and the second connection electrode is electrically connected to the first feeding port of the second feeding structure.

Each of the first connection electrode and the second connection electrode is made of copper.

The transparent antenna further includes a first connector and a second connector, both of which are fixed on a side of the reference electrode layer away from the first surface, wherein the first connector is electrically connected to the first connection electrode through a first via extending through the reference electrode layer and the first dielectric layer; and the second connector is electrically connected to the second connection electrode through a second via extending through the reference electrode layer and the first dielectric layer.

The first and second feeding structures are mirror symmetric with respect to an extending direction of a perpendicular bisector through a width of the reference electrode layer as an axis of symmetry.

The transparent antenna further includes:
a support structure, which is fixed on peripheries of the first substrate and the second substrate, so that a distance exists between the at least one second radiation part and a surface to be fixed of the transparent antenna.

The transparent antenna has a radiation region and a peripheral region surrounding the radiation region; the support structure has a side wall adapted to the peripheral region; and the side wall has a fifth surface and a sixth surface which are opposite to each other;
the first dielectric layer is connected to the fifth surface, the at least one second radiation part is defined in the support structure, and a distance exists between a plane, where the at least one second radiation part is located, and a plane, where the sixth surface is located.

The distance between the plane, where the at least one second radiation part is located, and the plane, where the sixth surface is located, is d; d=thickness×$\sqrt{\varepsilon_r}$, where thickness denotes a thickness of the surface to be fixed, $\varepsilon_r$ denotes a dielectric constant of the surface to be fixed.

The first dielectric layer includes a first base material, a first fixing plate and a second base material, which are stacked; a surface of the first base material away from the first fixing plate is the first surface; and a surface of the second base material away from the first fixing plate is the second surface.

The reference electrode layer is fixed and connected to the first base material though a first transparent adhesive layer; and the at least one first radiation part is fixed and connected to the second base material through a second transparent adhesive layer.

The transparent antenna further includes:
a plurality of support parts, which are between the second surface and the third surface, so that a distance exists between the at least one first radiation part and the at least one second radiation part.

The plurality of support parts and the first fixing plate have a one-piece structure.

The first fixing plate is made of polycarbonate.

The first base material is made of polyethylene terephthalate or polyimide.

The second dielectric layer includes a second fixing plate and a second base material, which are stacked; a surface of the second fixing plate away from the second base material is the third surface; and a surface of the second base material away from the second fixing plate is the fourth surface.

The second fixing plate is fixed and connected to the third base material through a third transparent adhesive layer.

The second fixing plate includes a plurality of fixing sub-plates arranged at intervals; the second base material includes a plurality of sub-base materials arranged at intervals; each of the plurality of fixing sub-plates and one of the plurality of sub-base materials are stacked, and on a surface of each of the plurality of sub-base materials away from the fixing sub-plate is arranged one of the at least one second radiation part.

Each of the plurality of fixing sub-plates is made of polycarbonate.

Each of the plurality of sub-base materials is made of polyethylene terephthalate or polyimide.

The at least one second radiation part includes a plurality of second radiation parts, and a distance between any two adjacent ones of the plurality of second radiation parts is in a range of 35 mm to 100 mm.

At least one of the at least one first radiation part, the at least one second radiation part, and the reference electrode layer includes a metal mesh.

The at least one first radiation part, the at least one second radiation part, and the reference electrode layer all include a metal mesh, and orthographic projections of hollow-out parts of the metal meshes of the three on the first dielectric layer completely overlap each other.

The metal mesh has a line width of 2 μm to 30 μm, a line spacing of 50 μm to 250 μm, and a line thickness of 1 μm to 10 μm.

The transparent antenna has an operating frequency of 2515 MHz to 2675 MHz.

The at least one first radiation part is in a one-to-one correspondence with the at least one second radiation part, and a shape of each of the at least one first radiation part is the same as that of a second radiation part corresponding to the first radiation part.

In a second aspect, an embodiment of the present disclosure provides a communication system, which includes the transparent antenna described above.

The transparent antenna is fixed to a surface of a glass window.

The communication system further includes:
a transceiving unit configured to transmit or receive a signal;
a radio frequency transceiver, which is connected to the transceiving unit and configured to modulate the signal transmitted by the transceiving unit or demodulate a signal received by the transparent antenna and then transmit the signal to the transceiving unit;
a signal amplifier, which is connected to the radio frequency transceiver and configured to improve a signal-to-noise ratio of the signal output by the radio frequency transceiver or the signal received by the transparent antenna;
a power amplifier, which is connected to the radio frequency transceiver and configured to amplify a power of the signal output by the radio frequency transceiver or the signal received by the transparent antenna; and
a filtering unit, which is connected to the signal amplifier, the power amplifier and the transparent antenna, and configured to filter the received signal and then transmit the filtered signal to the transparent antenna or filter the signal received by the transparent antenna.

DETAIL DESCRIPTION OF EMBODIMENTS

Figure 1:
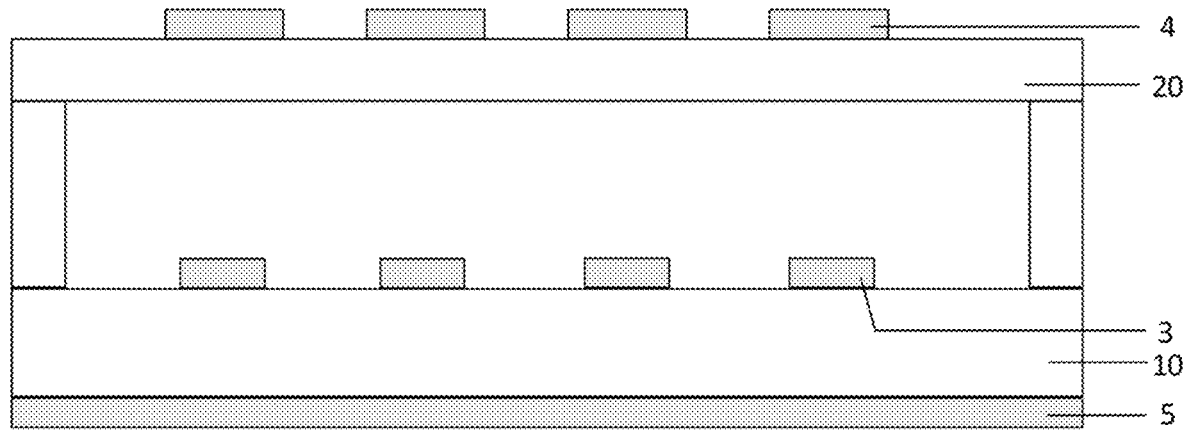
FIG. 1 illustrates a sectional view of a transparent antenna.

In order enable one of ordinary skill in the art to better understand the technical solutions of the present disclosure, the present disclosure is further described in detail with reference to the accompanying drawings and the detailed description below.

Unless defined otherwise, technical or scientific terms used herein shall have the ordinary meaning as understood by one of ordinary skill in the art to which the present disclosure belongs. The words "first", "second", and the like used in the present disclosure do not denote any order, quantity, or importance, but rather distinguish one element from another. Likewise, the word "a", "an", or "the" or the like does not denote a limitation of quantity, but rather denotes the presence of at least one. The word "comprising" or "comprises", or the like, means that an element or item preceding the word includes the element or item listed after the word and its equivalent, but does not exclude other elements or items. The word "connected" or "coupled" or the like is not restricted to physical or mechanical connections, but may include electrical connections, whether direct or indirect. "Upper", "lower", "left", "right", and the like are used only to indicate relative positional relationships, and when an absolute position of an object being described is changed, the relative positional relationships may also be changed accordingly.

The embodiments of the present disclosure are not limited to the embodiments shown in the drawings, but include modifications of configurations formed based on a manufacturing process. Thus, a region illustrated in the drawings has a schematic property, and a shape of the region shown in the drawings illustrates a specific shape of a region of an element, but is not intended to be limiting.

An embodiment of the present disclosure provides a transparent antenna that may be used in a glass window system for an automobile, a train (including a high-speed rail train), an aircraft, a building, or the like. The transparent antenna may be fixed on an inner side of the glass window (a side closer to the room). Since the transparent antenna has a higher optical transmittance, the transparent antenna has little influence on the transmittance of the glass window while realizing a communication function, and the transparent antenna will also become a trend toward an embellished antenna. The glass window according to an embodiment of the present disclosure includes, but is not limited to, a double-layer glass, and a type of the glass window may alternatively be a single-layer glass, a laminated glass, a thin glass, a thick glass, or the like. In an embodiment of the present disclosure, the glass window attached with the transparent antenna is applied to a subway window system, which is taken as an example for explanation. The transparent antenna has an operating frequency in a range of 2515 MHz to 2675 MHz.

FIG. 1 illustrates a sectional view of a transparent antenna. As shown in FIG. 1, the transparent antenna includes a first substrate and a second substrate disposed oppositely to each other. The first substrate may include a first dielectric layer 10, a reference electrode layer 5, and at least one first radiation part 3; the first dielectric layer 10 includes a first surface (lower surface) and a second surface (upper surface) that are oppositely disposed; the reference electrode layer 5 is disposed on the first surface, and the at least one first radiation part 3 is disposed on the second surface. The second substrate includes a second dielectric layer 20 and at least one second radiation part 4; the second dielectric layer 20 includes a third surface (lower surface) and a fourth surface (upper surface) that are oppositely disposed; the at least one second radiation part 4 is disposed on the fourth surface, and an air gap may be filled between the second surface of the first dielectric layer 10 and the third surface of the second dielectric layer. The at least one second radiation part 4 may be disposed in a one-to-one correspondence with the at least one first radiation part 3, and an orthographic projection of the at least one second radiation part 4 on the first dielectric layer 10 at least partially overlap an orthographic projection of the at least one first radiation part 3 corresponding to the at least one second radiation part 4 on the first dielectric layer 10. Alternatively, the transparent antenna may further include a feeding structure (not shown in FIG. 1), which may be connected to the at least one first radiation part.

The transparent antenna shown in FIG. 1 may be a receiving antenna, a transmitting antenna, or a transceiving antenna capable of transmitting and receiving signals. When the transparent antenna transmits a signal, a first feeding port of each feeding structure receives a radio frequency signal, the feeding structure divides the radio frequency signal into a plurality of sub-signals, each sub-signal is output through a second feeding port to a first radiation part connected to the second feeding port, and the first radiation part 3 feeds the sub-signal to the second radiation part 4 corresponding to the first radiation part 3. When the transparent antenna receives a signal, after any one second radiation part 4 receives a radio frequency signal, the radio frequency signal is fed to the first radiation part 3 corresponding to the second radiation part, and then the first radiation part 3 transmits the radio frequency signal to the first feeding port through the second feeding port connected to the first radiation part 3.

The transparent antenna shown in FIG. 1 is provided with the at least one first radiation part 3 and the at least one second radiation part 4, and the at least one first radiation part 3 and the at least one second radiation part 4 are arranged opposite to each other, and a signal (for example, a radio frequency signal) is fed to the corresponding second radiation part 4 through the at least one first radiation part 3, so that compared with a case where only the at least one first radiation part or the at least one second radiation part is arranged, a radiation area of a radiation unit is increased by the at least one first radiation part 3 and the at least one second radiation part 4, which are opposite to each other, and a radiation efficiency is effectively improved. Based on the transparent antenna shown in FIG. 1, an embodiment of the present disclosure provides a transparent antenna with more optimized performance. The transparent antenna according to an embodiment of the present disclosure is specifically described below.

Figure 2:
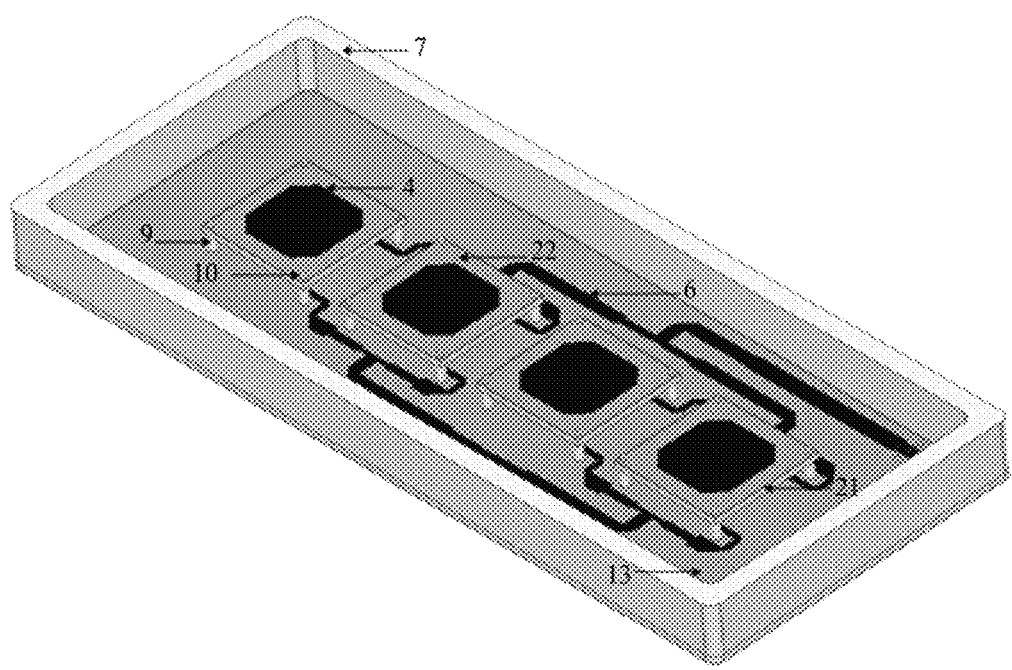
FIG. 2 is a perspective view of a transparent antenna according to an embodiment of the present disclosure.
Figure 3:
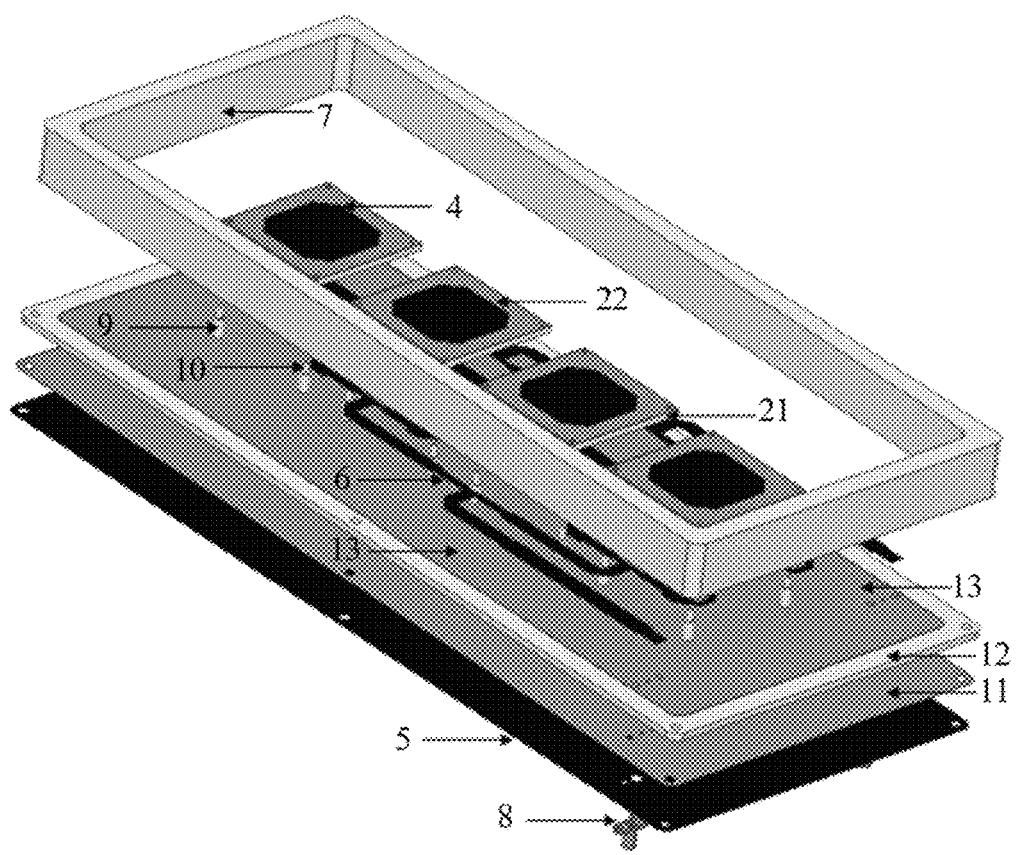
FIG. 3 is an exploded view of a transparent antenna according to an embodiment of the present disclosure.
Figure 4:
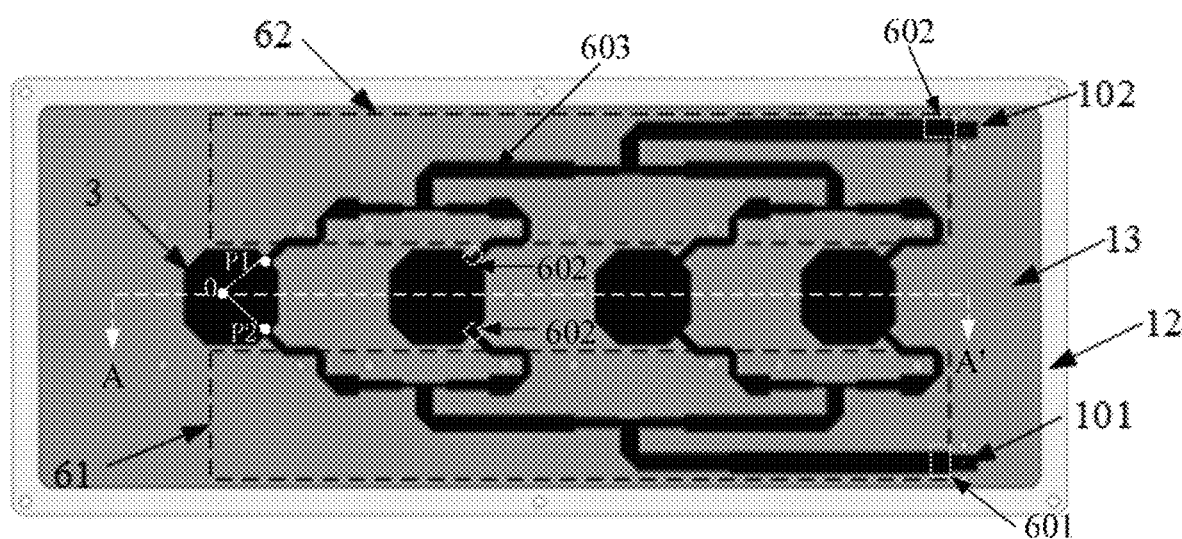
FIG. 4 is a top view of a first substrate of a transparent antenna according to an embodiment of the present disclosure.
Figure 5:
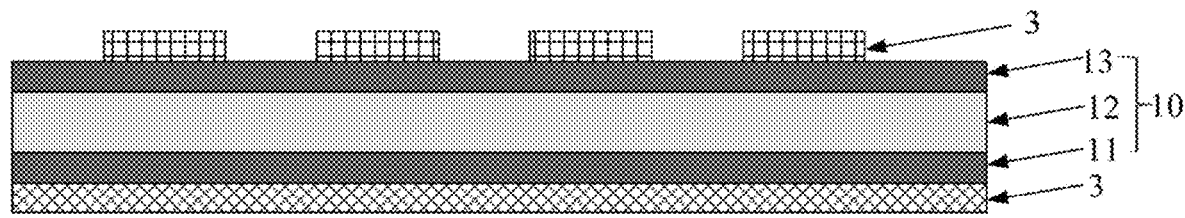
FIG. 5 is a sectional view taken along a line A-A' in FIG. 4.
Figure 6:
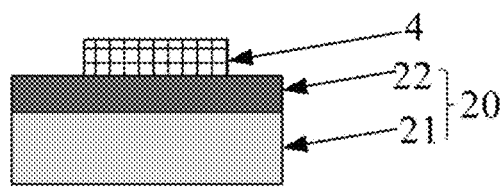
FIG. 6 is a partial sectional view of a second substrate of a transparent antenna according to an embodiment of the present disclosure.

FIG. 2 is a perspective view of a transparent antenna according to an embodiment of the present disclosure; FIG. 3 is an exploded view of a transparent antenna according to an embodiment of the present disclosure; FIG. 4 is a top view of a first substrate of a transparent antenna according to an embodiment of the present disclosure; FIG. 5 is a sectional view taken along a line A-A' in FIG. 4; FIG. 6 is a partial sectional view of a second substrate of the transparent antenna according to an embodiment of the present disclosure. In a first aspect, as shown in FIGS. 1 to 6, an embodiment of the present disclosure provides a transparent antenna including a first substrate and a second substrate disposed oppositely to each other. The first substrate includes a first dielectric layer 10, a reference electrode layer 5, at least one first radiation part 3, and at least one feeding structure 6. The second substrate includes a second dielectric layer 20 and at least one second radiation part 4. The first dielectric layer 10 includes a first surface (lower surface) and a second surface (upper surface) which are oppositely arranged; the reference electrode layer 5 is disposed on the first surface of the first dielectric layer 10, the at least one first radiation part 3 and the at least one feeding structure 6 are disposed on the second surface of the first dielectric layer 10, and the at least one feeding structure 6 is configured to feed a signal to the first radiation part 3. For example, a feeding structure 6 includes a first feeding port 601 and at least one second feeding port 602, the at least one second feeding port 602 of the feeding structure 6 is directly and electrically connected to the first radiation part 3, and the first feeding port 601 is configured to receive and/or transmit radio frequency signals. The second dielectric layer 20 includes a third surface and a fourth surface disposed oppositely to each other, and the third surface is closer to the second surface of the first dielectric layer 10 than the fourth surface and is disposed oppositely to the second surface. For example, at least one support part 9 is formed between the second surface and the third surface to maintain a gap therebetween. The at least one second radiation part 4 is disposed on the fourth surface of the second dielectric layer 20, and an orthographic projection of one second radiation part 4 on the first surface of the first dielectric layer 10 is located within an orthographic projection of one first radiation part 3 on the first surface of the first dielectric layer 10. For example, the at least one second radiation part 4 is arranged in a one-to-one correspondence with the at least one first radiation part 3, and an area of a first radiation part 3 is smaller than an area of a second radiation part 4 corresponding to the first radiation part 3.

It should be noted that the transparent antenna according to an embodiment of the present disclosure may be a receiving antenna, a transmitting antenna, or a transceiving antenna capable of transmitting and receiving signals. In the embodiments of the present disclosure, a plurality of first radiation parts 3 and a plurality of second radiation parts 4, which are in a one-to-one correspondence with each other, are described as an example. FIG. 1 only illustrates four first radiation parts 3 and four second radiation parts 4, but the embodiment of the present disclosure is not limited thereto. The reference electrode layer 5 includes, but is not limited to, a ground electrode layer. In an embodiment of the present disclosure, as an example, the reference electrode layer 5 is the ground electrode layer for description.

When the transparent antenna transmits a signal, the first feeding port 601 of the feeding structure 6 receives a radio frequency signal, the feeding structure 6 divides the radio frequency signal into a plurality of sub-signals, each sub-signal is output to the first radiation part 3 connected to the second feeding port 602 through the second feeding port 602, and the first radiation part 3 feeds the sub-signal to the second radiation part 4 directly opposite to the first radiation part 3. When the radiation antenna receives a signal, after any one second radiation part 4 receives a radio frequency signal, the radio frequency signal is fed to the first radiation part 3 directly opposite to the second radiation part 4, and the second radiation part 4 transmits the radio frequency signal to the first feeding port 601 through the second feeding port 602 connected to the first radiation part 3.

The transparent antenna according to an embodiment of the present disclosure is provided with the at least one first radiation part 3 and the at least one second radiation part 4, which cooperate to radiate a radio frequency signal, so that compared with an antenna provided with only the first radiation part(s) 3, radiation efficiency is effectively improved. Furthermore, the antenna according to an embodiment of the present disclosure is a transparent antenna, which is beneficial to embellishment of the antenna.

Figure 7:
FIG. 7 is a schematic diagram of a support structure of a transparent antenna according to an embodiment of the present disclosure.

In some examples, a distance between the second surface of the first dielectric layer 10 and the third surface of the second dielectric layer 20 is a first distance, that is, a certain gap exists between the first dielectric layer 10 and the second dielectric layer 20, and in this case, an air gap may exist between the first dielectric layer 10 and the second dielectric layer 20. A distance between the second surface of the first dielectric layer 10 and the fourth surface of the third dielectric layer is a second distance, a ratio of the second distance to the first distance is not less than 1.12, and further, the ratio of the second distance to the first distance is not less than 1.37. The ratio of the second distance to the first distance according to an embodiment of the present disclosure may be specifically defined according to a radiation efficiency of the transparent antenna. FIG. 7 is a schematic diagram of a support structure of a transparent antenna according to an embodiment of the present disclosure. In some examples, as shown in FIGS. 1, 2, and 7, the transparent antenna according to an embodiment of the present disclosure includes not only the first substrate and the second substrate, but also a support structure, which is fixed at least to the first substrate, so that the first substrate and the second substrate may be fixed to a surface to be fixed, and a certain distance exists between the second radiation part and the surface to be fixed. The surface to be fixed of the transparent antenna is a surface of the glass window to be fixed. It should be understood that when the support structure is fixed to the surface of the glass window, an orthographic projection of the support structure on the surface of the glass window does not overlap an orthographic projection of the second radiation part on the surface of the glass window. In an embodiment of the present disclosure, the support structure may be a support frame 7, and the support frame 7 is fixed to peripheries of the first substrate and the second substrate, so that the second radiation part 4 has a certain distance from the surface of glass window with the radiation transparent antenna attached. Alternatively, the support structure may be at least one support pillar, the at least one support pillar may include a plurality of support pillars, and the support pillars are evenly connected to a peripheral region of the first dielectric layer 10, so that a certain distance exists between the second radiation part 4 and the surface of the glass window with the transparent antenna attached. Since a contact area of the support frame 7 with the surface of the glass window is greater than a contact area of the support pillars with the surface of the glass window, the support frame 7 is preferably employed as a support structure in an embodiment of the present disclosure.

Further, the transparent antenna has a radiation region and a peripheral region surrounding the radiation region; the support frame 7 has a side wall adapted (conformal) to the peripheral region. For example, a contour of the peripheral region is quadrilateral, and in this case, the side wall of the support frame 7 is a rectangular ring, as shown in FIG. 1. The side wall has a fifth surface (lower surface) and a sixth surface (upper surface) that are opposite to each other, and the second surface of the first dielectric layer 10 may be connected to the fifth surface, so as to fix the first substrate to the support frame 7. For example, a threaded through hole is formed in the peripheral region of the first dielectric layer 10, a threaded blind hole is formed at the fifth surface of the side wall of the support frame 7, and a screw is screwed into the threaded through hole and the threaded blind hole to fix the first dielectric layer 10 to the support side wall. When the side wall of the support frame 7 is a rectangular ring, threaded blind holes may be respectively formed at four corners of the fifth side surface of the support side wall, threaded through holes may be formed correspondingly at four corners of the peripheral region of the first dielectric layer 10, respectively, and the first dielectric layer 10 may be fixed to the support side wall by four screws, which are respectively fixedly connected to the threaded through holes and the threaded blind holes disposed correspondingly. It should be noted that the support frame 7 and the first dielectric layer 10 are fixed by screws in the above. However, in an actual product, the support frame 7 and the first dielectric layer 10 may alternatively be fixed and connected to each other by an adhesive. For example, a layer of transparent optical adhesive is coated on the fifth surface of the support frame 7 or the second surface of the first dielectric layer 10, so that the fifth surface is adhered to the second surface by the transparent optical adhesive so as to connect the support frame 7 to the first dielectric layer 10. The method has a simple process and a lower cost, and does not increase a whole thickness of the transparent antenna. Alternatively, the support frame 7 may be connected to the first dielectric layer 10 by means of a snap-fit.

In the transparent antenna according to an embodiment of the present disclosure, the second radiation part 4 is defined in a space surrounded by the side wall of the support frame 7, and there is a certain distance between a plane where the second radiation part 4 is located and the sixth surface of the side wall. Due to a large dielectric constant and a large tangent angle loss of glass itself, when the radio frequency signal radiated from the antenna is incident into the surface of the glass window, an energy of the radio frequency signal begins to be greatly attenuated. In addition, the radio frequency signal incident into the glass window diffuses along an extending direction of the glass surface, so that a width of a beam transmitting out of the glass window is widened, and finally a gain of the antenna is reduced. However, in an embodiment of the present disclosure, when the transparent antenna is fixed to the glass window through the support frame 7 of the transparent antenna, a certain distance may exist between the second radiation part 4 and the glass window, and even if the distance is small, a good radiation characteristic, that is, a high gain characteristic may be ensured.

Figure 8:
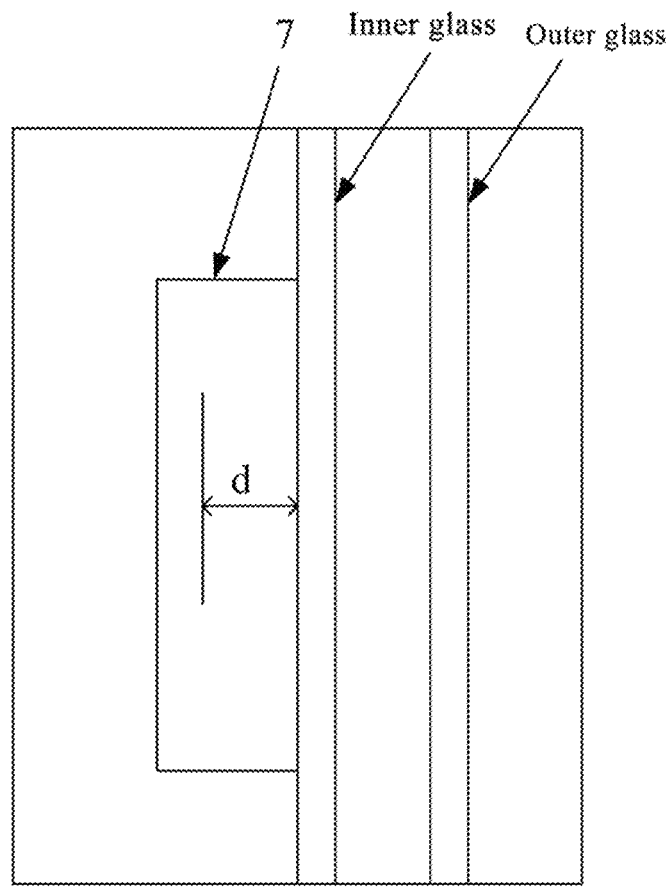
FIG. 8 is a schematic diagram of fixing a transparent antenna to a surface of a glass window according to an embodiment of the present disclosure.

FIG. 8 is a schematic diagram of fixing a transparent antenna to a surface of a glass window according to an embodiment of the present disclosure. For example, as shown in FIG. 8, the support frame 7 may be configured that the second radiation part 4 is spaced from the surface of the glass window by a distance d; d=thickness×$\sqrt{\varepsilon_r}$, where "thickness" denotes a thickness of the surface of the glass window, and $\varepsilon_r$ denotes a dielectric constant of the surface of the glass window. It should be noted that where the glass window is a double-layer glass, "thickness" here denotes a thickness of an inner glass of the glass window. For example, a total thickness of the double-layer glass is 18 mm, a thickness of a middle interlayer of air is 9 mm, a thickness of an outer glass is 5 mm, and a thickness of the inner glass is 4 mm, that is, the "thickness" is 4 mm. $\varepsilon_r$ denotes a dielectric constant of the inner glass. In one example, where the thickness of the inner glass is 4 mm, the distance d between the second radiation part 4 and the surface of the glass window is 10 mm (0.086λc, where λc is a wavelength of a center frequency). In this case, after the transparent antenna is attached to the glass window, the gain of the antenna is higher, for example not lower than 8 dBi. In addition, the farther the second radiation part 4 is from the glass window, the more excellent the radiation performance is.

In some examples, a ratio of the distance d between the second radiation part 4 and the surface of the glass window to the distance (the second distance) between the second surface of the first dielectric layer and the fourth surface of the second dielectric layer is not less than 1.18. By reasonably setting the ratio of the distance d to the second distance, radiation efficiency may be improved.

In some examples, a material of the support frame 7 may include plastic, such as Polycarbonate (PC), Copolymers of Cycloolefin (COP), or acrylic/Polymethyl Methacrylate (PMMA). When the support frame 7 is fixed to the glass window, it may be adhered to the glass window by glue.

In some examples, in the embodiments of the present disclosure, the at least one first radiation part 3 is disposed in a one-to-one correspondence with the at least one second radiation part 4, and patterns of the at least one first radiation part 3 and the at least one second radiation part 4 are the same, and are similar to the structure shown in FIG. 1. For example, the first radiation part 3 and the second radiation part 4 are all circular or polygonal in shape. In one example, the first radiation part 3 and the second radiation part 4 both have centrosymmetric patterns, and orthographic projections of centers of the first radiation part 3 and the second radiation part 4 on the first surface of the first dielectric layer 10 are coincident with each other. In an embodiment of the present disclosure, the first radiation part 3 and the second radiation part 4 are polygonal in shape, and each internal angle of the polygon is greater than 90°. For example, the polygon is an octagon and includes a first side, a second side, a third side, a fourth side, a fifth side, a sixth side, a seventh side and an eighth side which are sequentially connected; an extending direction of the first side is the same as that of the fifth side, and is perpendicular to that of the third side; a second feeding port of a first feeding structure and a second feeding port of a second feeding structure are connected to the second side and the fourth side, respectively. In this case, the polygon is equivalent to being formed by cutting off four right angles of a square to form flat chamfers. In this way, impedance matching is achieved to reduce a loss.

Figure 9:
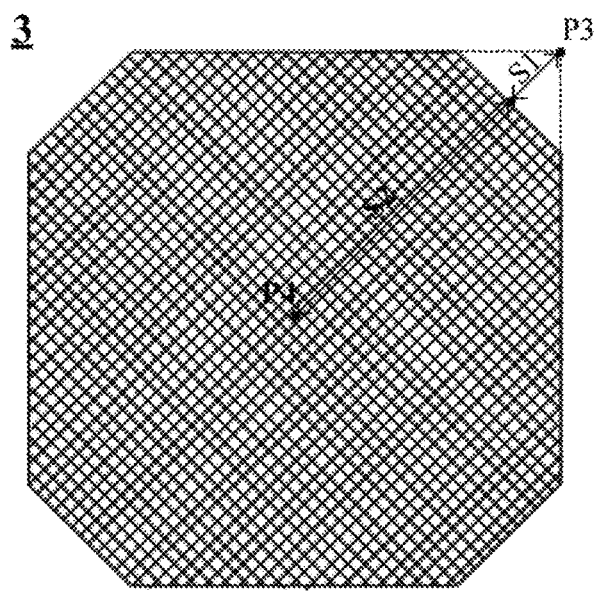
FIG. 9 is a schematic diagram of a first radiation part of a transparent antenna according to an embodiment of the present disclosure.

FIG. 9 is a schematic diagram of a first radiation part of a transparent antenna according to an embodiment of the present disclosure. In some examples, as shown in FIG. 9, the second side, the fourth side, the sixth side and the eighth side of the first radiation part 3 have a same length, the first side and the fifth side have a same length, and the third side and the seventh side have a same length; a shortest distance from an intersection point P3 between extension lines of the first side and the third side to the flat chamfer is S1, and a shortest distance from the center P3 of the first radiation part to the second side is S2; a ratio of S1 to S2 depends on requirements for the impedance, e.g., S2:S1=2:1. Accordingly, the second radiation part 4 has a same shape as the first radiation part 3.

In the following description, both the first radiation part 3 and the second radiation part 4 are exemplified with the shape shown in FIG. 9.

In some examples, as shown in FIG. 4, the transparent antenna is a dual-polarized antenna that includes two feeding structures 6, that is, a first feeding structure 61 and a second feeding structure 62. The first feeding structure 61 and the second feeding structure 62 each include one first feeding port 601 and four second feeding ports 602. The four second feeding ports 602 of the first feeding structure 61 are connected to four first radiation parts 3 in a one-to-one correspondence, and a node at which each second feeding port 602 of the first feeding structure 61 is connected to the corresponding first radiation part 3 is a first node P1. The second ports of the second feeding structure 62 are respectively connected to the four first radiation parts 3 in a one-to-one correspondence, and a node at which each second feeding port 602 of the second feeding structure 62 is connected to the corresponding first radiation part 3 is a second node P2. Meanwhile, for any one of the first radiation parts 3, an extending direction of a connecting line between the first node P1 and the center O of the first radiation part 3 intersects with an extending direction of a connecting line between the second node P2 and the center O, that is, the first node P1, the second node P2 and the center line O are not on a same straight line. That is, the first and second feeding structures 61 and 62 have different feeding directions for the same first radiation part 3, thereby implementing a dual-polarized transparent antenna.

In one example, for any one of the first radiation parts 3, where sizes of the respective flat chamfers of the first radiation part 3 are the same, the corresponding second feeding port 602 of the first feeding structure 61 and the corresponding second feeding port 602 of the second feeding structure 62 are respectively connected to two adjacent flat chamfers. In this way, it may be implemented that the first feeding structure 61 and the second feeding structure 62 have different feeding directions for the same first radiation part 3.

Further, for any one of the first radiation parts 3, where the corresponding second feeding port 602 of the first feeding structure 61 and the corresponding second feeding port 602 of the second feeding structure 62 are respectively connected to midpoints of two adjacent flat chamfers, an extending direction of a connecting line between the first node and the center of the first radiation part 3 and an extending direction of a connecting line of the second node and the center are perpendicular to each other. For example, the feeding direction of the first feeding structure 61 is a horizontal direction, and the feeding direction of the second feeding structure 62 is a vertical direction. Alternatively, the corresponding second feeding port 602 of the first feeding structure 61 and the corresponding second feeding port 602 of the second feeding structure 62 do not need to be connected to the midpoints of two adjacent flat chamfers, as long as the extending direction of the connecting line between the node, at which the second feeding port 602 of the first feeding structure 61 is connected to the first radiation part 3, and the center of the first radiation part 3 does not coincide with the extending direction of the connecting line between the node, at which the second feeding port 602 of the second feeding structure 62 is connected to the first radiation part 3, and the center of the first radiation part 3.

In some examples, with continued reference to FIG. 3, the first and second feeding structures 61 and 62 are respectively disposed on both sides of the first radiation parts 3, and are mirror-symmetrical with respect to a perpendicular bisector that penetrates one side of one first radiation part as a symmetry axis. With this arrangement, devices may be evenly distributed on the first surface of the first dielectric layer 10, a better radiation direction and gain may be obtained, and at the same time, a uniform optical transmittance of the transparent antenna may be ensured.

In some examples, the first feeding structure 61 and the second feeding structure 62 may both be power division feeding networks. For example, the number of the first radiation parts 3 is $2^n$, and the first radiation parts 3 are arranged at intervals along a length direction of the transparent antenna. The first feeding structure 61 and the second feeding structure 62 each include n stages of first microstrip lines 603. One first microstrip line 603 at the $1^{st}$ stage is connected to two adjacent first radiation parts 3, and the first radiation parts 3 connected to different first microstrip lines 603 at the $1^{st}$ stage are different. One first microstrip line 603 at the $m^{th}$ stage is connected to two adjacent first microstrip lines 603 at the $(m-1)^{th}$ stage, and the first microstrip lines 603 at the $(m-1)^{th}$ stage connected to different first microstrip lines 603 at the $m^{th}$ stage are different, where $n \geq 2$, $2 \leq m \leq n$, and both m and n are integers.

It should be noted that in the first feeding structure 61, an end of the first microstrip line 603 at the $1^{st}$ stage connected to the first radiation part 3 serves as the second feeding port 602 of the first feeding structure 61, and an end of the first microstrip line 603 at the $n^{th}$ stage not connected to the first microstrip line 603 at the $(n-1)^{th}$ stage serves as the first feeding port 601 of the first feeding structure 61. In the second feeding structure 62, an end of the first microstrip line 603 at the $1^{st}$ stage connected to the first radiation part 3 serves as the second feeding port 602 of the second feeding structure 62, and an end of the first microstrip line 603 at the $n^{th}$ stage not connected to the first microstrip line 603 at the $(n-1)^{th}$ stage serves as the first feeding port 601 of the second feeding structure 62.

In one example, with continued reference to FIG. 3, the number of the first radiation parts 3 is four, and each of the first feeding structure 61 and the second feeding structure 62 employs two stages of first microstrip lines 603 with a one-to-two and two-to-four division. In the first feeding structure 61, both ends (as the second feeding ports 602) of each of two first microstrip lines 603 at the $1^{st}$ stage are connected to two adjacent first radiation parts 3, respectively; both ends of the first microstrip line 603 at the $2^{nd}$ stage are connected to two first microstrip lines 603 at the $1^{st}$ stage (connected to midpoints of the two first microstrip lines 603), respectively, and a port is provided at a midpoint of the first microstrip line 603 at the $2^{nd}$ stage and serves as the first feeding port 601. Similarly, in the second feeding structure 62, both ends (as the second feeding ports 602) of each of two first microstrip lines 603 at the $1^{st}$ stage are connected to two adjacent first radiation parts 3, respectively; both ends of the first microstrip line 603 at the $2^{nd}$ stage are connected to two first microstrip lines 603 at the $1^{st}$ stage (connected to midpoints of the first microstrip lines 603), respectively, and a port is provided at a midpoint of the first microstrip line 603 at the $2^{nd}$ stage and serves as the first feeding port 601.

In some examples, the first feeding port 601 of the first feeding structure 61 is connected to a first connection electrode 101 as a first feeding terminal; the first feeding port 601 of the second feeding structure 62 is connected to a second connection electrode 102 as a second feeding terminal. In one example, a material of each of the first connection electrode 101 and the second connection electrode 102 includes, but is not limited to, copper, and for example, a metal material such as aluminum, silver, or the like may alternatively be used. In an embodiment of the present disclosure, the connection electrodes made of copper is preferably used, so that an insertion loss of the radio frequency signal may be effectively reduced.

Further, referring to FIG. 2, the transparent antenna includes not only the above structure but also a first connector 8 and a second connector (not shown in the figure). The first connector 8 and the second connector are of the same structure, and are both fixed on a side of the reference electrode layer 5 away from the first surface. The first connector is electrically connected to the first connection electrode 101 through a first via extending through the reference electrode layer 5 and the first dielectric layer 10; the second connection electrode is electrically connected to the second connection electrode 102 through a second via extending through the reference electrode layer 5 and the first dielectric layer 10. It should be noted that the first connector 8 and the second connector 8 are fixed to the reference electrode layer 5, but actually are insulated from the reference electrode layer 5, and inner cores of the first connector 8 and the second connector 8 are electrically connected to the corresponding feeding ports. For example, the first connector 8 and the second connector 8 include, but are not limited to, a SMA (Small A type) connectors.

In some examples, as shown in FIGS. 4 and 5, the first dielectric layer 10 of the first substrate includes a first base material 11, a first fixing plate 12, and a second base material 13 that are stacked. The first base material 11 and the first fixing plate 12 may be fixed and connected to each other by a first adhesive layer; the second base material 13 and the first fixing plate 12 may be fixed and connected to each other by a second adhesive layer. A surface of the first base material 11 away from the first fixing plate 12 is the first surface, and a surface of the second base material 13 away from the first fixing plate 12 is the second surface. That is, the reference electrode layer 5 is disposed on the surface of the first base material 11 away from the first base material 11, and the first radiation part 3 and the feeding structure 6 are disposed on the surface of the second base material 13 away from the first fixing plate 12.

The materials of the first base material 11 and the second base material 13 may be the same or different. For example, the first base material 11 and the second base material 13 are flexible films made of a material including, but not limited to, Polyethylene Terephthalate (PET), or Polyimide (PI), or the like. In an embodiment of the present disclosure, as an example, the first base material 11 and the second base material 13 are both made of PET. The first base material 11 and the second base material 13 each have a thickness of about 50 μm to about 250 μm. The first base material 11 and the second base material 13 are flexible and cannot provide good support for the first radiation part 3, the feeding structure 6 and the reference electrode layer 5, and is easily deformed, so that a desired radiation effect cannot be obtained. Thus, the first fixing plate 12 is employed to maintain a rigidity of the first substrate, and a material of the first fixing plate 12 includes, but is not limited to, Polycarbonate (PC), Copolymers of Cycloolefin (COP) or acrylic/Polymethyl Methacrylate (PMMA). A thickness of the first fixing plate 12 is in a range of about 1 mm to about 3 mm. The materials of the first adhesive layer and the second adhesive layer may be the same or different. For example, Optically Clear Adhesive (OCA) is adopted as the material of the first adhesive layer and the second Adhesive layer.

Figure 10:
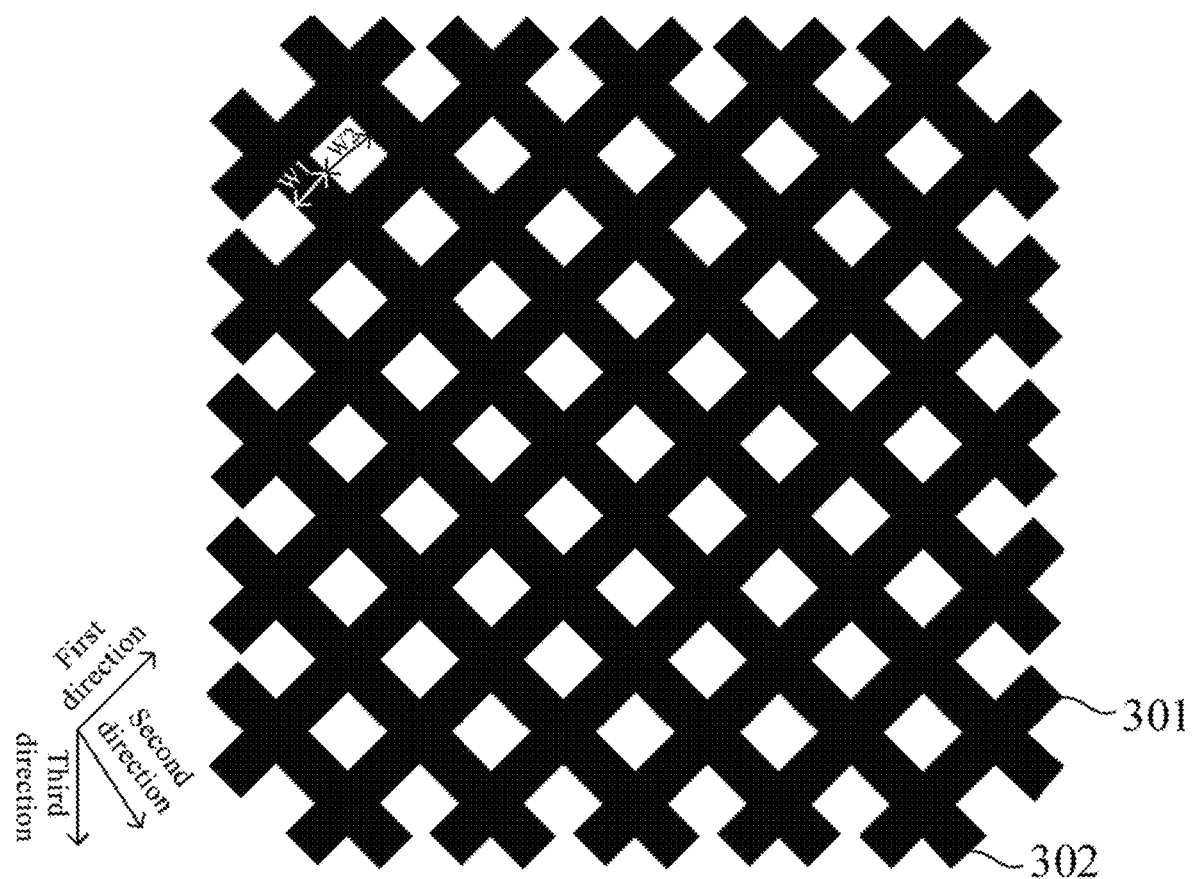
FIG. 10 is a schematic diagram of a metal mesh of a transparent antenna according to an embodiment of the present disclosure.

FIG. 10 is a top view of a first radiation part of a transparent antenna according to an embodiment of the present disclosure. As shown in FIG. 10, the first radiation part 3 and the reference electrode layer 5 include, but are not limited to, a metal mesh, which may include a plurality of first metal lines 301 and a plurality of second metal lines 302 intersecting with each other. The first metal lines 301 are arranged side by side along a first direction and extend along a second direction; the second metal lines 302 are disposed side by side along the first direction and extend along a third direction.

In some examples, ends of the first metal lines 301 and the second metal lines 302 of the first radiation part 3 are connected together, that is, a periphery of the first radiation part 3 is a closed loop structure. In an actual product, as shown in FIG. 10, the ends of the first metal lines 301 and the second metal lines 302 of the first radiation part 3 may not be connected to each other, that is, the periphery of the first radiation part 3 is radial. Similarly, the metal mesh of the reference electrode layer 5 may be disposed in a same manner as the first radiation part, and therefore, the description thereof is not repeated herein. In an embodiment of the present disclosure, a light transmittance of each metal mesh is in a range of about 70% to about 88%.

In some examples, orthographic projections of hollow-out parts of the metal meshes of the first radiation part 3 and the reference electrode layer 5 on the first dielectric layer 10 completely overlap with each other, so that the light transmittance of the transparent antenna may be effectively improved. The extending directions of each first metal line 301 and each second metal line 302 of the metal mesh may be perpendicular to each other, and in this case, square or a rectangular hollow-out parts are formed. Alternatively, the extending directions of each first metal line 301 and each second metal line 302 of the metal mesh may be not perpendicular to each other. For example, an included angle between the extending directions of each first metal line 301 and each second metal line 302 is 45°, and in this case, diamond-shaped hollow-out parts are formed.

In some examples, a line width, a line thickness and a line spacing of each first metal line 301 of the metal mesh of each of the first radiation part 3 and the reference electrode layer 5 are preferably the same as those of each second metal line, respectively, and may alternatively be different from those of each second metal line 302. For example, each of the first metal line 301 and the second metal line 302 has the line width W1 in a range of about 1 µm to about 30 µm, and the line spacing W2 in a range of about 50 µm to 250 µm; the line thickness in a range of about 0.5 µm to about 10 µm. Where the first radiation part 3 and the reference electrode layer 5 each adopt the metal mesh, the reference electrode layer 5 may be formed on the surface of the first base material 11 away from the first fixing plate 12, and the first radiation part 3 is formed on the surface of the second base material 13 away from the first fixing plate 12, through a process including, but not limited to, imprinting or etching.

Figure 11:
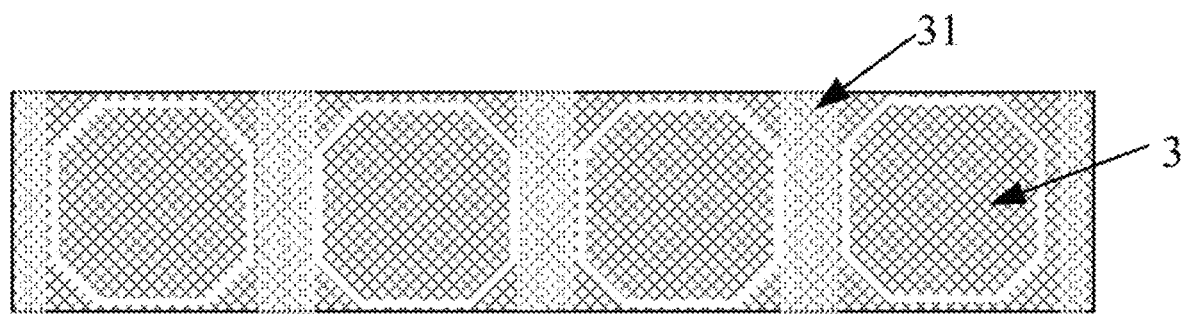
FIG. 11 is a schematic diagram of a first radiation layer of a transparent antenna according to an embodiment of the present disclosure.

FIG. 11 is a schematic diagram of a first radiation layer of a transparent antenna according to an embodiment of the present disclosure. In some examples, as shown in FIG. 11, a first radiation layer is formed on the second surface of the first dielectric layer 10, and the first radiation layer includes a metal mesh, which may include a plurality of first metal lines and a plurality of second metal lines intersecting with each other. The first metal lines are arranged side by side along the first direction and extend along the second direction; the second metal lines are arranged side by side along the first direction and extend along the third direction. The first radiation layer includes a plurality of first radiation parts 3 and first redundant radiation electrodes 31, and the first redundant radiation electrodes 31 are disconnected from the first radiation parts 3, that is, the first metal lines are disconnected from the second metal lines at junctions between the first redundant radiation electrodes 31 and the first radiation parts 3. The first metal lines and the second metal lines in the first radiation electrodes are disconnected from each other at intersecting positions. In this case, the first radiation parts 3 and the first redundant radiation electrodes may be formed by a one-patterning process, and may be formed by forming an entire layer of first and second metal lines intersecting with each other, and then performing a cutting process on the first and second metal lines. In some examples, a width of each of positions, where the first metal lines and the second metal lines in the first radiation layer are disconnected from each other, are both in a range of about 1 µm to about 30 µm. Alternatively, the width of each of the positions where the first metal lines and the second metal lines in the first radiation layer are disconnected from each other may be specifically defined according to the radiation requirements for the transparent antenna. In some examples, the reference electrode layer 5 may cover the first surface of the first dielectric layer 10. The reference electrode layer 5 having such the structure is conveniently formed. In some examples, an orthographic projection of the reference electrode layer 5 on the first dielectric layer 10 may only overlap the orthographic projections of the first radiation part 5 and the feeding structure 6 on the first dielectric layer 10, and for the rest positions, the material of the reference electrode layer 5 is removed. In this way, the light transmittance may be effectively improved. Of course, it should be understood that a shape of the reference electrode layer 5 is not limited in an embodiment of the present disclosure, as long as the orthographic projection of the reference electrode layer 5 on the first dielectric layer 10 overlaps and covers the orthographic projections of the first radiation part 5 and the feeding structure 6 on the first dielectric layer 10.

In some examples, a plurality of support parts 9 are formed between the second surface of the first dielectric layer 10 and the third surface of the second dielectric layer 20, to maintain a distance between the first substrate and the second substrate. For example, the plurality of support parts 9 may be evenly arranged between the second surface of the first dielectric layer 10 and the third surface of the second dielectric layer 20.

In one example, where the first dielectric layer 10 employs the first base material 11, the first fixing plate 12, and the second base material 13 that are stacked as described above, the first fixing plate 12 and the support parts 9 may have a one-piece structure, in which case the support parts 9 and the second dielectric layer 20 may be fixed together in a manner including, but not limited to, a hot melting columns 10 or a screw. In this way, the first dielectric layer 10 to the second dielectric layer 20 may be well fixed together.

In some examples, the second dielectric layer 20 of the second substrate includes a second fixing plate 21 and a third base material 22 which are stacked; the third fixing plate and the third base material 22 may be fixed and connected to each other by a third adhesive layer. A surface of the second fixing plate 21 away from the third base material 22 is the third surface, and a surface of the third base material 22 away from the second fixing plate 21 is the fourth surface. That is, the second radiation part 4 is formed on the surface of the third base material 22 away from the second fixing plate 21.

A material of the third base material 22 may be the same as or different from that of the first base material 11 and the second base material 13. For example, the third base material 22 is made of a flexible film, which is the same as the first base material 11 and the second base material 13, and the material of the flexible film includes, but is not limited to, Polyethylene Terephthalate (PET), Polyimide (PI), or the like. In an embodiment of the present disclosure, as an example, the first base material 11, the second base material 13, and the third base material 22 are made of PET. The third base material 22 has a thickness in a range of about 50 µm to about 250 µm. Since the third base material 22 is flexible and cannot provide a good support for the second radiation part 4, the second fixing plate 21 is used to maintain the rigidity of the second substrate, and a material of the second fixing plate 21 includes, but is not limited to, Polycarbonate (PC), Copolymers of Cycloolefin (COP), or acryl/Polymethyl Methacrylate (PMMA). The thickness of the first fixing plate 12 is about in a range of 1 mm to about 3 mm. A material of the third adhesive layer may be the same as or different from that of each of the first adhesive layer and the second adhesive layer. For example, the third adhesive layer is made of the same material as the first adhesive layer and the second adhesive layer, and all of them are made of Optically Clear Adhesive (OCA).

In some examples, a size of the second radiation part 4 may be in a range of about 50 mm×50 mm to about 60 mm×60 mm. For example, the size of the second radiation part 4 is 55 mm×55 mm ($0.476\lambda c \times 0.476\lambda c$, where $\lambda c$ is a wavelength of a center frequency). A distance between the second radiation parts 4 arranged adjacently is in a range of about 35 mm to about 100 mm. For example, the distance between the second radiation parts 4 arranged adjacently is 75 mm ($0.65\lambda c$, where $\lambda c$ is a wavelength of a center frequency). Alternatively, the size of the second radiation part 4 and the distance between the adjacent radiation parts may be specifically defined according to a size of the transparent antenna and various performance parameters.

In some examples, the second radiation part 4 may have the same structure as the first radiation part, that is, preferably, the second radiation part may have a metal mesh. For example, where the second radiation part, the first radiation part and the reference electrode all adopt the metal mesh, orthographic projections of the hollow-out parts of the second radiation part, the first radiation part and the reference electrode on the first dielectric layer 10 completely overlap each other, so that a radiation efficiency, a gain and an optical transmittance may be improved. The second radiation part 4 has the same structure as the first radiation part 3, except that an area of the second radiation part 4 is greater than that of the first radiation part 3, so detailed description of the specific structure of the second radiation part 4 is omitted. In some examples, as shown in FIG. 6, the second dielectric layer 20 in the second substrate includes the second fixing plate 21 and the third base material 22 which are stacked; wherein the second fixing plate 21 includes a plurality of fixing sub-plates; the third base material 22 includes a plurality of sub-base materials; the fixing sub-plates are arranged in a one-to-one correspondence with the sub-base materials. One second radiation part 4 is arranged on a surface of the sub-base material away from the fixing sub-plate, and the sub-base material and the fixing plate are adhered to each other through the third adhesive layer.

The fixing sub-plate may be made of the same material as the second fixing plate 21, and the sub-base material may be made of the same material as the third base material 22.

In one example, where the second fixing plate 21 includes the plurality of fixing sub-plates, the support parts 9 and the first fixing plate may have a one-piece structure, in which case one support part 9 may be disposed at each corner of the fixing sub-plate to ensure that the fixing sub-plate is relatively stable with respect to the first dielectric layer 10. For example, through holes are arranged at four corners of the fixing sub-plate, a hot melting column 10 is arranged on each of the support parts 9, the hot melting columns 10 are arranged in a one-to-one correspondence with through holes in the fixing sub-plate, and the support parts 9 and the fixing sub-plate are connected to each other in a hot melting manner.

In some examples, the support parts 9 may be disposed such that a distance between the first radiation part 3 and the second radiation part 4, which are correspondingly disposed, is in a range of about 4 mm to about 8 mm. By reasonably setting the distance between the first radiation part 3 and the second radiation part 4, the transmission loss of the radio frequency signal may be effectively reduced.

In some examples, the second radiation part 4 may have the same structure as the first radiation part 3, and both of them adopt a metal mesh, and the structure of the metal mesh is the same as the structure of the first radiation part 3 of the metal mesh, so that the description thereof is omitted here.

In addition, where the reference electrode layer 5, the first radiation part 3 and the second radiation part 4 all adopt a metal mesh, the light transmittance of the transparent antenna may reach about 70% to about 88%.

In some examples, the materials of the reference electrode layer 5, the first radiation part 3, the second radiation part 4 and the feeding structure 6 include, but are not limited to, a metal material such as copper, silver, aluminum, or the like, which are not limited in an embodiment of the present disclosure.

In order to make the structure and effect of the transparent antenna according to an embodiment of the present disclosure clearer, a specific structure of a transparent antenna is given below.

Referring to FIGS. 1 to 6, an overall size of the transparent antenna may be in a range of about 420 mm×180 mm to about 360 mm×140 mm. For example, the overall size of the transparent antenna is 385 mm×160 mm (3.33$\lambda$c×1.384$\lambda$c). The transparent antenna includes a first substrate and a second substrate, which are oppositely arranged, and a support frame 7. The first substrate includes a first dielectric layer 10, a reference electrode layer 5, at least one first radiation part 3, a first feeding structure 61 and a second feeding structure 62. The first dielectric layer 10 includes a first base material 11, a first fixing plate 12 and a second base material 13 which are stacked, wherein the first base material 11 and the first fixing plate 12 are connected to each other through a first adhesive layer, and the second base material 13 and the second fixing plate 21 are connected to each other through a second adhesive layer; the reference electrode layer 5 is disposed on a surface of the first base material 11 away from the first fixing plate 12, and main radiation layers and the first and second feeding structures 61 and 62 are disposed on a surface of the second base material 13 away from the first fixing plate 12. The number of the main radiation layers is 4, and the main radiation layers are arranged side by side at intervals along a length direction of the transparent antenna, and the first feeding structure 61 and the second feeding structure 62 adopt a power division feeding network, that is, the feeding structure 6 shown in FIG. 3. The second substrate includes a second fixing plate 21 and a third base material 22 which are stacked; wherein the second fixing plate 21 includes a plurality of fixing sub-plates; the third base material 22 includes a plurality of sub-base materials; the fixing sub-plates are arranged in a one-to-one correspondence with the sub-base materials. A second radiation part 4 is arranged on a surface of a sub-base material away from the corresponding fixing sub-plate, and the sub-base material and the fixing plate are adhered to each other through the third adhesive layer. A size of the second radiation part 4 may be in a range of about 50 mm×50 mm to about 60 mm×60 mm. For example, the size of the second radiation part 4 is 55 mm×55 mm (0.476$\lambda$c×0.476$\lambda$c, where $\lambda$c is a wavelength of a center frequency); a distance between the second radiation parts 4 disposed adjacent to each other is about 75 mm (0.65$\lambda$c). The first base material 11, the second base material 13 and the third base material 22 are all made of PET transparent films; the first fixing plate 12 and the second fixing plate 21 are both plastic fixing plates, and a thickness of each of the first fixing plate 12 and the second fixing plate 21 is in a range of about 1 mm to about 3 mm. Each main radiation layer, a parasitic radiation layer and the reference electrode layer 5 are all made of a metal mesh, which has a line width in a range of 2 m to 30 μm; a line spacing in a range of 50 μm to 250 μm; a line thickness in a range of 1 m to 10 μm. The support frame 7 is fixed to the first fixing plate 12, and the support frame 7 is fixed to the window glass by a sealant, and the support frame 7 may be configured that a distance between the second radiation part 4 and a surface of the window glass is 10 mm (0.086$\lambda$c, where $\lambda$c is a wavelength of a center frequency).

Figure 12:
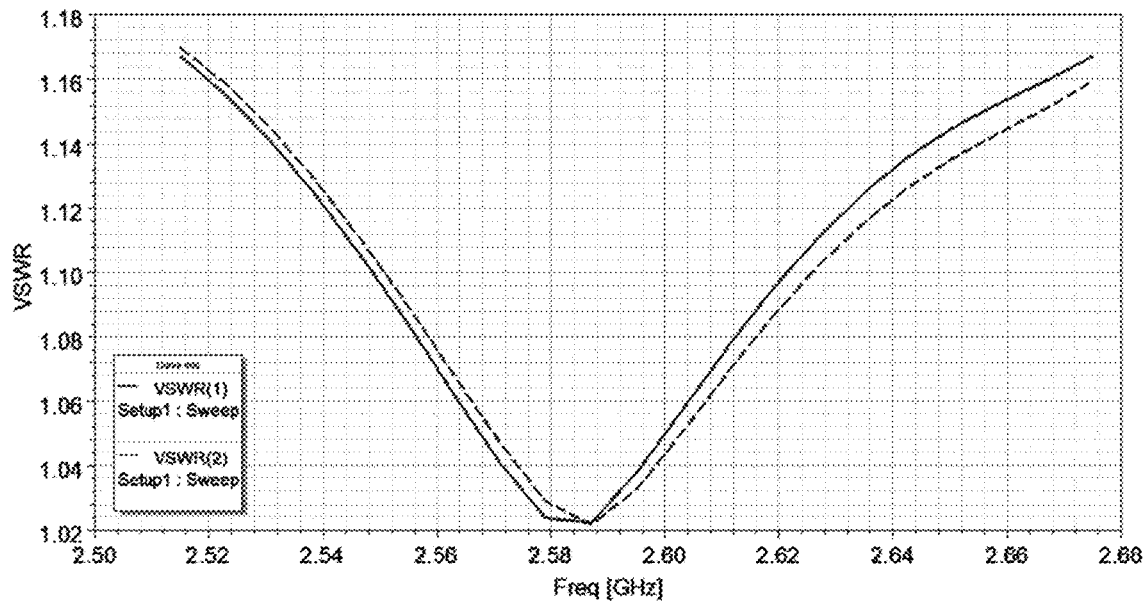
FIG. 12 is a schematic diagram of a standing wave ratio of a transparent antenna attached to a glass window according to an embodiment of the present disclosure.
Figure 13:
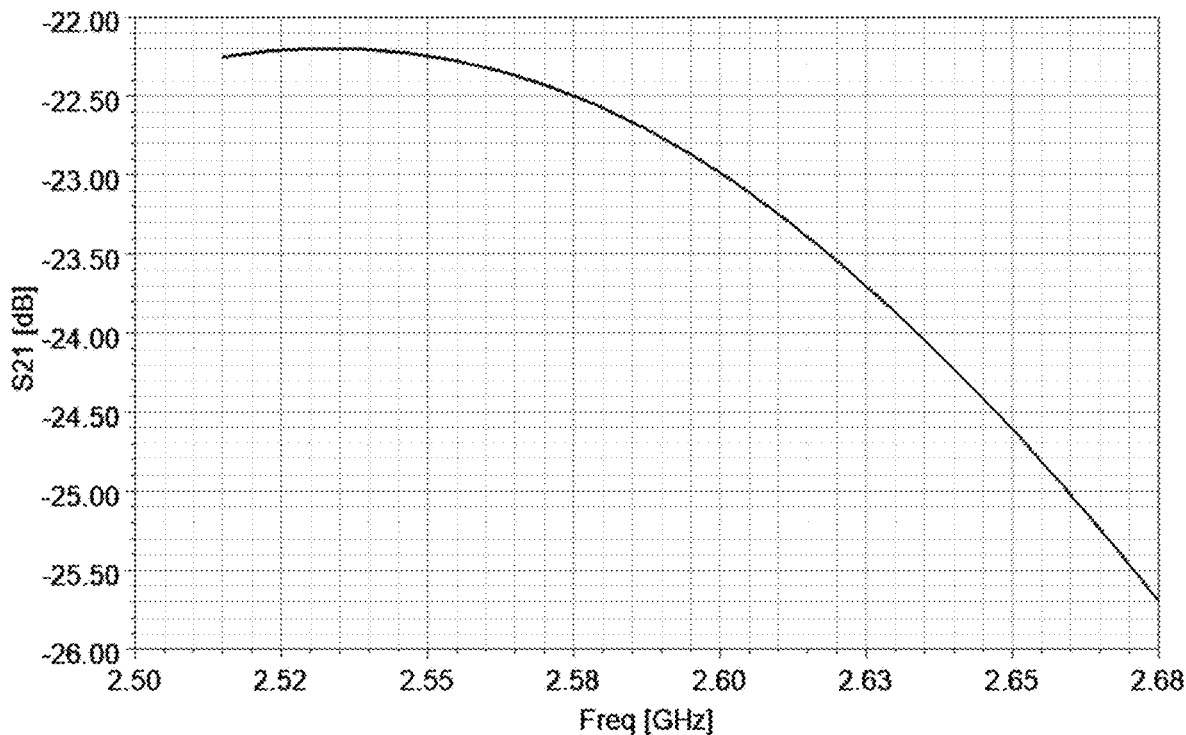
FIG. 13 is a schematic diagram of an isolation of a transparent antenna attached to a glass window according to an embodiment of the present disclosure.
Figure 14:
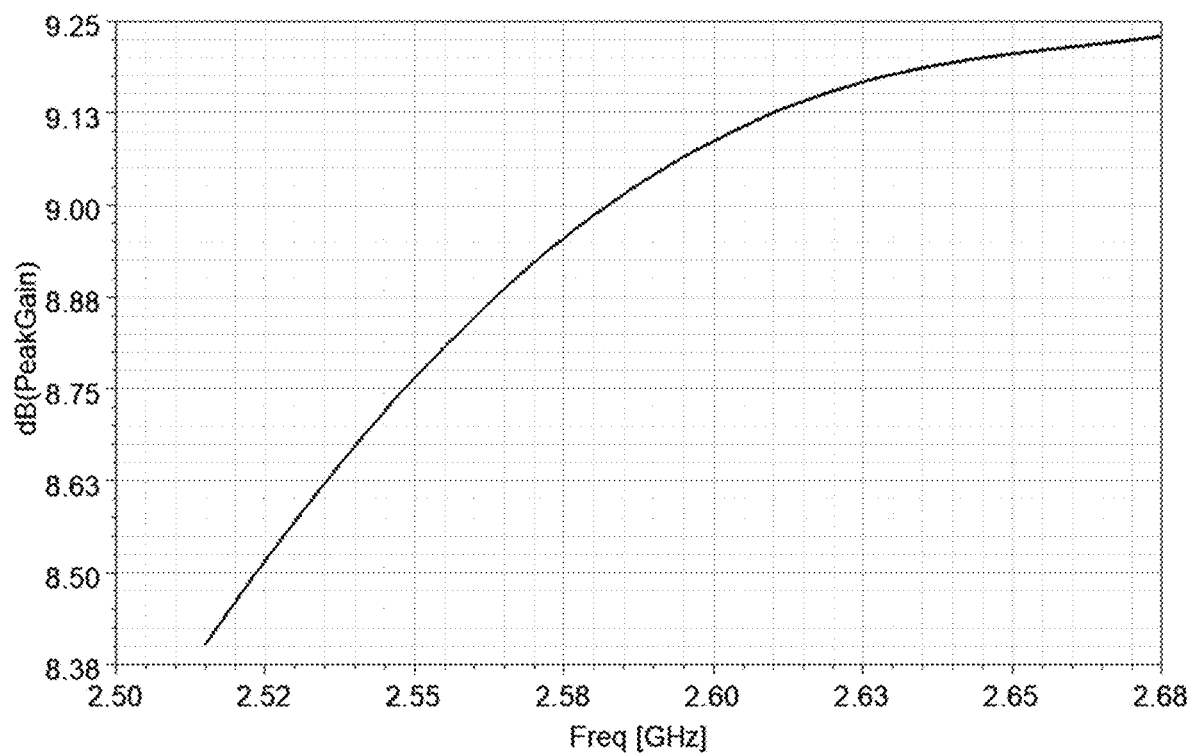
FIG. 14 is a schematic diagram of a gain of a transparent antenna attached to a glass window according to an embodiment of the present disclosure.

For the above transparent antenna, the inventors performed simulation experiments. FIG. 12 is a schematic diagram of a standing wave ratio of a transparent antenna attached to a glass window according to an embodiment of the present disclosure. As can be seen from FIG. 12, through optimization, the transparent antenna according to an embodiment of the present disclosure obtains excellent matching characteristics with a standing wave ratio of less than 1.18 at an operating frequency. FIG. 13 is a schematic diagram of an isolation of a transparent antenna attached to a glass window according to an embodiment of the present disclosure. The transparent antenna according to an embodiment of the present disclosures has an isolation of greater than 22 dB at an operating frequency. FIG. 14 is a schematic diagram of a gain of a transparent antenna attached to a glass window according to an embodiment of the present disclosure. The transparent antenna according to an embodiment of the present disclosure may realize a characteristic of a high gain of greater than 8 dBi, and ensure the receiving and transmitting strength of a communication signal.

In the transparent antenna according to an embodiment of the present disclosure, the first base material 11 is made of a PET transparent film, and a transparent metal conductive film with excellent surface light transmittance is formed by using a metal mesh through an imprinting or etching process, and is used as the reference electrode layer 5, the at least one first radiation part 3, and the at least one second radiation part 4 of the transparent antenna. And then, the formed three different conductive films (i.e., the reference electrode layer 5, the at least one first radiation part 3, and the at least one second radiation part 4) are adhered to a hard transparent fixing plate with a thickness of 1 mm to 3 mm through an OCA optical adhesive, to improve the physical strength of the structure. In this way, it may not only realize excellent light transmission of the antenna, but also ensure the reliability of the whole structure of the antenna, and greatly improve the mass production. Secondly, benefiting from the transparent characteristic of the antenna, the transparent antenna according to an embodiment of the present disclosure may be attached to the glass window for use, so that the fusion of the antenna and the glass window environment is realized, and the effects of concealing and embellishing the indoor environment are achieved. Thirdly, due to a large dielectric constant and a large tangent angle loss of glass itself, when an electromagnetic wave radiated by the antenna is incident into a glass surface, an energy of the electromagnetic wave begins to be greatly attenuated. In addition, the electromagnetic wave incident into the glass diffuses along the extending direction of the glass surface, so that a width of a beam transmitting out of the glass window is widened, and finally a gain of the antenna is reduced. However, the transparent antenna according to an embodiment of the present disclosure uses the transparent annular support frame 7, and thus, ingeniously reserves an effective radiation gap of 10 mm (0.086λc, where λc is a wavelength of a center frequency) between a parasitic radiation surface of the antenna and the inner surface of the glass window, so that the transparent antenna according to an embodiment of the present disclosure may still ensure a good radiation characteristic, that is, a high gain characteristic, even when the transparent antenna is attached to the glass window at a short distance. The farther the transparent antenna according to an embodiment of the present disclosure is from the glass window, the more excellent the radiation performance is. Fourthly, since the transparent annular support frame 7 is of a hollow structure, a weight of the support frame 7 is greatly reduced, so that a whole weight of the transparent antenna is reduced, which is important for the firmness of the transparent antenna attached to the glass window.

Figure 15:
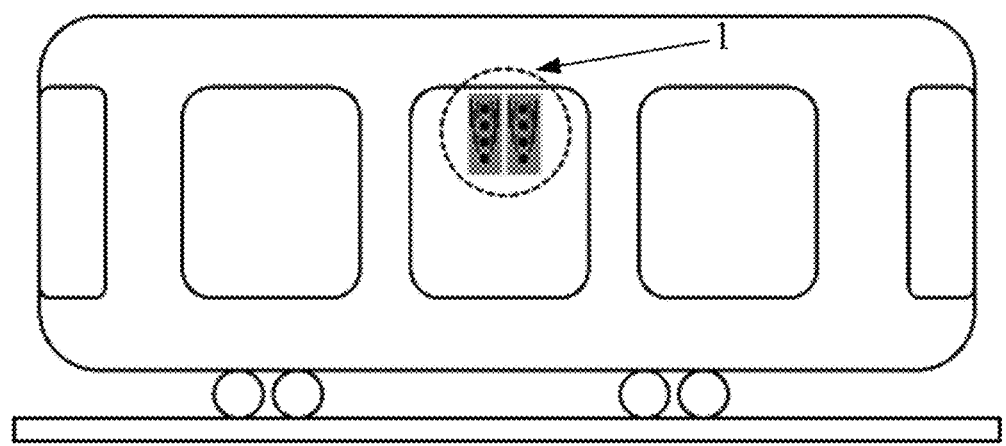
FIG. 15 is a schematic diagram of attaching a transparent antenna to a glass window according to an embodiment of the present disclosure.

In a second aspect, an embodiment of the present disclosure provides an antenna system, which may include the transparent antenna 1 described above. The transparent antenna 1 may be fixed on an inner side of a glass window, as shown in FIG. 15.

The glass window system according to an embodiment of the present disclosure may be used in an automobile, a train (including a high-speed rail train), an aircraft, a building, or the like. The transparent antenna 1 may be fixed on an inner side (a side close to the room) of the glass window. Since the transparent antenna 1 has a high optical transmittance, it has little influence on the transmittance of the glass window while realizing a communication function, and the transparent antenna 1 will also be a trend toward an embellished antenna. The glass window according to an embodiment of the present disclosure includes, but is not limited to, a double-layer glass, and a type of the glass window may alternatively be a single-layer glass, a laminated glass, a thin glass, a thick glass, or the like.

Figure 16:
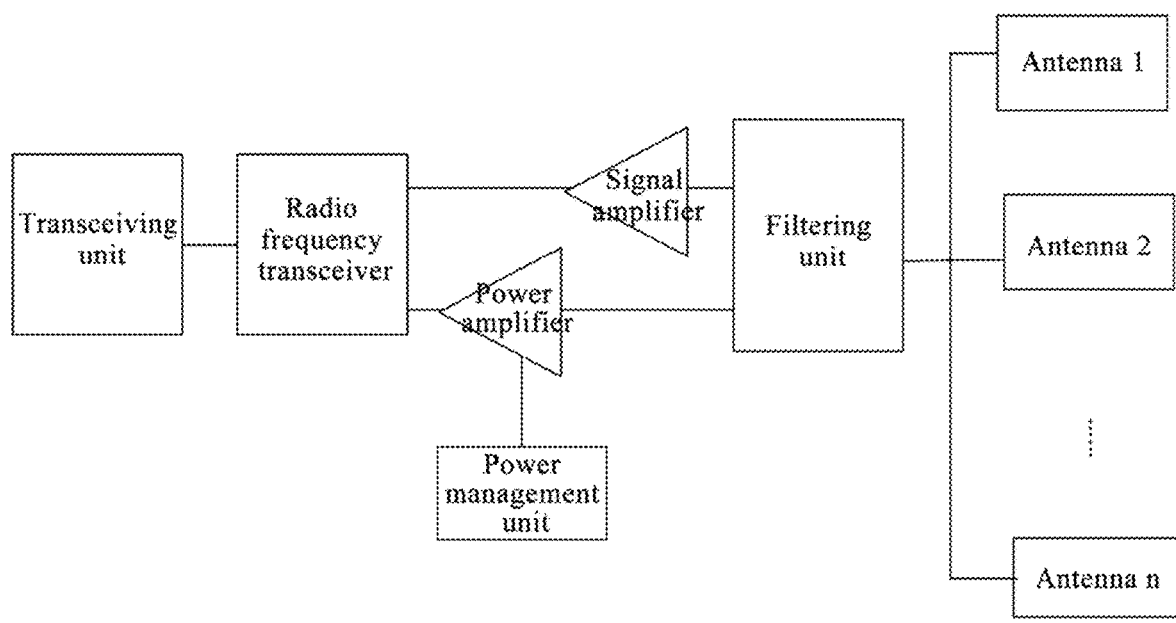
FIG. 16 is a schematic diagram of an antenna system according to an embodiment of the present disclosure.

FIG. 16 is a schematic diagram of an antenna system according to an embodiment of the present disclosure. In some examples, as shown in FIG. 16, the antenna system according to an embodiment of the present disclosure further includes a transceiving unit, a radio frequency transceiver, a signal amplifier, a power amplifier, and a filtering unit. The transparent antenna 1 in the antenna system may be used as a transmitting antenna or as a receiving antenna. The transceiving unit may include a baseband and a receiving terminal, where the baseband provides a signal of at least one frequency band, for example, provides a 2G signal, a 3G signal, a 4G signal, a 5G signal, or the like, and transmits the signal of at least one frequency band to the radio frequency transceiver. After receiving a signal, the transparent antenna 1 in the antenna system may transmit the signal to a receiving terminal in the transceiving unit after the signal is processed by the filtering unit, the power amplifier, the signal amplifier, and the radio frequency transceiver, where the receiving terminal may be, for example, an intelligent gateway.

Further, the radio frequency transceiver is connected to the transceiving unit and is used for modulating the signals transmitted by the transceiving unit or for demodulating the signals received by the transparent antenna and then transmitting the signals to the transceiving unit. Specifically, the radio frequency transceiver may include a transmitting circuit, a receiving circuit, a modulating circuit, and a demodulating circuit. After the transmitting circuit receives various types of signals provided by the baseband, the modulating circuit may modulate the various types of signals provided by the baseband, and then transmit the modulated signals to the antenna. The transparent antenna receives the signal and transmits the signal to the receiving circuit of the radio frequency transceiver, the receiving circuit transmits the signal to the demodulating circuit, and the demodulating circuit demodulates the signal and transmits the demodulated signal to the receiving terminal.

Further, the radio frequency transceiver is connected to the signal amplifier and the power amplifier, the signal amplifier and the power amplifier are further connected to the filtering unit, and the filtering unit is connected to at least one transparent antenna 1. In the process of transmitting a signal by the antenna system, the signal amplifier is used for improving a signal-to-noise ratio of the signal output by the radio frequency transceiver and then transmitting the signal to the filtering unit; the power amplifier is used for amplifying a power of the signal output by the radio frequency transceiver and then transmitting the signal to the filtering unit; the filtering unit specifically includes a duplexer and a filtering circuit, the filtering unit combines signals output by the signal amplifier and the power amplifier into a signal and filters out noise waves and then transmits the signal to the transparent antenna, and the transparent antenna 1 radiates the signal. In the process of receiving a signal by the antenna system, the transparent antenna 1 receives the a signal and then transmits the signal to the filtering unit, the filtering unit filters out noise waves in the signal received by the antenna and then transmits the signal to the signal amplifier and the power amplifier, and the signal amplifier gains the signal received by the antenna and increases the signal-to-noise ratio of the signal; the power amplifier amplifies a power of the signal received by the transparent antenna 1. The signal received by the transparent antenna 11 is processed by the power amplifier and the signal amplifier and then transmitted to the radio frequency transceiver, and the radio frequency transceiver transmits the signal to the transceiving unit.

In some examples, the signal amplifier may include various types of signal amplifiers, such as a low noise amplifier, which is not limited herein.

In some examples, the antenna system according to an embodiment of the present disclosure further includes a power management unit, connected to the power amplifier, for providing the power amplifier with a voltage for amplifying the signal.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and scope of the present disclosure, and these changes and modifications are to be considered within the scope of the present disclosure.

What is claimed is:

1. A transparent antenna, comprising a first substrate and a second substrate which are opposite to each other,
    wherein the first substrate comprises:
    a first dielectric layer, which has a first surface and a second surface which are opposite to each other;
    a reference electrode layer, which is on the first surface;
    at least one first radiation part, which is on the second surface, wherein an orthographic projection of at least one first radiation part on the first surface at least partially overlaps an orthographic projection of the reference electrode layer on the first surface; and
    at least one feeding structure, which is on the second surface and electrically connected to the at least one first radiation part, and
    the second substrate comprises:
    a second dielectric layer, which has a third surface and a fourth surface which are opposite to each other, wherein the third surface is opposite to the second surface; and
    at least one second radiation part, which is on the fourth surface, wherein an orthographic projection of each of the at least one first radiation part on the first surface is within an orthographic projection of one of the at least one second radiation part on the first surface.

2. The transparent antenna according to claim 1, wherein
    a distance between the second surface of the first dielectric layer and the third surface of the second dielectric layer is a first distance;
    a distance between the second surface of the first dielectric layer and the fourth surface of the second dielectric layer is a second distance; and a ratio of the second distance to the first distance is not less than 1.12.

3. The transparent antenna according to claim 1, wherein each of the at least one first radiation part and the at least one second radiation part has a centrosymmetric pattern, and
    an orthographic projection of a symmetry center of one of the at least one first radiation part on the first surface overlaps an orthographic projection of a symmetry center of one of the at least one second radiation part on the first surface.

4. The transparent antenna according to claim 3, wherein the at least one feeding structure comprises a first feeding structure and a second feeding structure, each of which comprises a first feeding port and at least one second feeding port;
    each of the at least one second feeding port of the first feeding structure is connected to one of the at least one first radiation part, and a node at which the second feeding port is connected to the first radiation part is a first node; each of the at least one second feeding port of the second feeding structure is connected to one of the at least one first radiation part, and a node at which the second feeding port is connected to the first radiation part is a second node; and
    for each of the at least one first radiation part, there is a included angle between an extending direction of a connecting line, which is between the first node and the symmetry center of the first radiation part, and an extending direction of a connecting line, which is between the second node and the symmetry center of the first radiation part.

5. The transparent antenna according to claim 4, wherein for each of the at least one first radiation part, an extending direction of a connecting line between the first node and the symmetry center of the first radiation part is perpendicular to an extending direction of a connecting line between the second node and the symmetry center of the first radiation part.

6. The transparent antenna according to claim 4, wherein the at least one first radiation part comprises $2^n$ first radiation parts, which are arranged at intervals along a length direction of the transparent antenna;
    each of the first feeding structure and the second feeding structure comprises n stages of first microstrip lines;
    one first microstrip line at a $1^{st}$ stage is connected to two adjacent first radiation parts, and the first radiation parts connected to different first microstrip lines at the $1^{st}$ stage are different; and
    one first microstrip line at an $m^{th}$ stage is connected to two adjacent first microstrip lines at an $(m-1)^{th}$ stage, and the first microstrip lines at the $(m-1)^{th}$ stage, which are connected to different first microstrip lines at the $m^{th}$ stage, are different;
    where n≥2, 2≤m≤n, and both m and n are integers.

7. The transparent antenna according to claim 4, further comprising
    a first connection electrode and a second connection electrode, which are on the second surface, wherein
    the first connection electrode is electrically connected to the first feeding port of the first feeding structure; and
    the second connection electrode is electrically connected to the first feeding port of the second feeding structure.

8. The transparent antenna according to claim 7, further comprising a first connector and a second connector, both of which are fixed on a side of the reference electrode layer away from the first surface, wherein the first connector is electrically connected to the first connection electrode through a first via extending through the reference electrode layer and the first dielectric layer; and the second connector is electrically connected to the second connection electrode through a second via extending through the reference electrode layer and the first dielectric layer.

9. The transparent antenna according to claim 4, wherein the first feeding structure and the second feeding structure are mirror symmetric with respect to an extending direction of a perpendicular bisector through a width of the reference electrode layer as an axis of symmetry.

10. The transparent antenna according to claim 1, further comprising:

a support structure, which is fixed on peripheries of the first substrate and the second substrate, so that a distance exists between the at least one second radiation part and a surface to be fixed of the transparent antenna.

11. The transparent antenna according to claim 10, wherein the transparent antenna has a radiation region and a peripheral region surrounding the radiation region;

the support structure has a side wall adapted to the peripheral region;

the side wall has a fifth surface and a sixth surface which are opposite to each other;

the first dielectric layer is connected to the fifth surface, the at least one second radiation part is defined in the support structure, and a distance exists between a plane where the at least one second radiation part is located and a plane where the sixth surface is located.

12. The transparent antenna according to claim 11, wherein the distance between the plane where the at least one second radiation part is located and the plane where the sixth surface is located is d; $d = \text{thickness} \times \vec{\varepsilon}_r$, where thickness denotes a thickness of the surface to be fixed, denotes a dielectric constant of the surface to be fixed.

13. The transparent antenna according to claim 1, wherein the first dielectric layer comprises a first base material, a first fixing plate and a second base material, which are stacked;

a surface of the first base material away from the first fixing plate is the first surface; and a surface of the second base material away from the first fixing plate is the second surface.

14. The transparent antenna according to claim 1, wherein the second dielectric layer comprises a second fixing plate and a second base material, which are stacked;

a surface of the second fixing plate away from the second base material is the third surface; and a surface of the second base material away from the second fixing plate is the fourth surface.

15. The transparent antenna according to claim 14, wherein the second fixing plate comprises a plurality of fixing sub-plates arranged at intervals;

the second base material comprises a plurality of sub-base materials arranged at intervals;

each of the plurality of fixing sub-plates and one of the plurality of sub-base materials are stacked, and on a surface of each of the plurality of sub-base materials away from the fixing sub-plate is arranged one of the at least one second radiation part.

16. The transparent antenna according to claim 1, wherein at least one of the at least one first radiation part, the at least one second radiation part, and the reference electrode layer comprises a metal mesh.

17. The transparent antenna according to claim 16, wherein the at least one first radiation part, the at least one second radiation part, and the reference electrode layer all comprise a metal mesh, and orthographic projections of hollow-out parts of the metal meshes of the at least one first radiation part, the at least one second radiation part, and the reference electrode layer on the first dielectric layer completely overlap each other.

18. The transparent antenna according to claim 1, wherein the at least one first radiation part is in a one-to-one correspondence with the at least one second radiation part, and a shape of each of the at least one first radiation part is the same as that of a second radiation part corresponding to the first radiation part.

19. A communication system, comprising the transparent antenna according to claim 1.

20. The communication system according to claim 19, further comprising:

a transceiving unit configured to transmit or receive a signal;

a radio frequency transceiver, which is connected to the transceiving unit and configured to modulate the signal transmitted by the transceiving unit or demodulate a signal received by the transparent antenna and then transmit the signal to the transceiving unit;

a signal amplifier, which is connected to the radio frequency transceiver and configured to improve a signal-to-noise ratio of the signal output by the radio frequency transceiver or the signal received by the transparent antenna;

a power amplifier, which is connected to the radio frequency transceiver and configured to amplify a power of the signal output by the radio frequency transceiver or the signal received by the transparent antenna; and a filtering unit, which is connected to the signal amplifier, the power amplifier and the transparent antenna, and configured to filter the received signal and then transmit the filtered signal to the transparent antenna or filter the signal received by the transparent antenna.

* * * * *